United States Patent [19]

Anderson et al.

[11] Patent Number: 5,969,058

[45] Date of Patent: Oct. 19, 1999

[54] COLOR-PLUS-CLEAR COMPOSITE COATING COMPOSITION CONTAINING TIN CATALYSTS

[75] Inventors: Lawrence G. Anderson, Pittsburgh; Gerald W. Gruber, Gibsonia; Kurt A. Humbert, Allison Park; Gregory J. McCollum, Gibsonia; Karen A. Barkac, Murrysville; John W. Burgman, Gibsonia; Robert D. Lippert, Butler, all of Pa.

[73] Assignee: PPG Industries Ohio, Inc., Cleveland, Ohio

[21] Appl. No.: 08/997,284

[22] Filed: Dec. 23, 1997

[51] Int. Cl.⁶ .................................................. C08F 283/00
[52] U.S. Cl. .................. 525/506; 525/107; 525/111.5; 525/533; 502/349
[58] Field of Search ............................ 502/349; 525/107, 525/111.5, 506, 533

[56] References Cited

U.S. PATENT DOCUMENTS

| | | | |
|---|---|---|---|
| Re. 32,261 | 10/1986 | Hirota et al. | 525/285 |
| 2,933,459 | 4/1960 | Gurgiolo | 260/2 |
| 3,773,694 | 11/1973 | Nakata et al. | 260/2 A |
| 3,855,360 | 12/1974 | Shim | 260/929 |
| 3,980,579 | 9/1976 | Syrop et al. | 252/182 |
| 3,989,652 | 11/1976 | Shim | 260/2.5 AR |
| 4,042,645 | 8/1977 | Hirota et al. | 260/830 |
| 4,052,354 | 10/1977 | Beiter et al. | 260/29.6 M |
| 4,092,377 | 5/1978 | Shim | 260/969 |
| 4,102,942 | 7/1978 | Smith et al. | 260/836 |
| 4,119,593 | 10/1978 | Smith et al. | 260/18 EP |
| 4,147,679 | 4/1979 | Scriven et al. | 260/29.2 TN |
| 4,174,339 | 11/1979 | Matsuda et al. | 260/40 R |
| 4,220,679 | 9/1980 | Backhouse | 427/401 |
| 4,348,201 | 9/1982 | Hayashi et al. | 8/94.18 |
| 4,395,528 | 7/1983 | Leiner et al. | 528/45 |
| 4,403,003 | 9/1983 | Backhouse | 427/407.1 |
| 4,407,997 | 10/1983 | Sghibartz | 524/202 |
| 4,426,464 | 1/1984 | Sghibartz | 523/122 |
| 4,451,573 | 5/1984 | Ikegami et al. | 502/113 |
| 4,487,713 | 12/1984 | Spohn | 260/453 P |
| 4,547,532 | 10/1985 | Bednarski et al. | 523/122 |
| 4,554,185 | 11/1985 | Lane et al. | 427/385.5 |
| 4,596,724 | 6/1986 | Lane et al. | 427/385.5 |
| 4,650,718 | 3/1987 | Simpson et al. | 428/413 |
| 4,654,368 | 3/1987 | Sakamoto et al. | 514/493 |
| 4,681,811 | 7/1987 | Simpson et al. | 428/413 |
| 4,764,430 | 8/1988 | Blackburn et al. | 428/413 |
| 4,769,398 | 9/1988 | Kanda et al. | 523/122 |
| 4,927,868 | 5/1990 | Schimmel et al. | 523/439 |
| 4,981,924 | 1/1991 | Nichols et al. | 505/528 |
| 4,987,244 | 1/1991 | Nichols et al. | 556/29 |
| 5,071,904 | 12/1991 | Martin et al. | 524/458 |
| 5,196,485 | 3/1993 | McMonigal et al. | 525/327.3 |
| 5,382,597 | 1/1995 | Boualam et al. | 514/493 |
| 5,384,367 | 1/1995 | Swarup et al. | 525/169 |
| 5,407,707 | 4/1995 | Simeone et al. | 427/410 |
| 5,663,111 | 9/1997 | Gadberry et al. | 501/146 |
| 5,718,817 | 2/1998 | Bossert et al. | 204/501 |

FOREIGN PATENT DOCUMENTS

| | | |
|---|---|---|
| 2131416 | 3/1995 | Canada . |
| 0643112 | 3/1995 | European Pat. Off. . |
| WO95/00493 | 1/1995 | WIPO . |
| WO97/29854 | 8/1997 | WIPO . |
| WO97/30131 | 8/1997 | WIPO . |
| WO97/47701 | 12/1997 | WIPO . |
| WO98/12268 | 3/1998 | WIPO . |

OTHER PUBLICATIONS

*Synthesis of Triaryltin Hydrides* by Stern & Becker, Nov. 1964, pp. 3221–3225.

Principles of Polymer Chemistry (Dec. 1953) Cornell University Press, pp. 52–57.

Patent Application Serial No. 08/997,282, filed Dec. 23, 1997 entitled "Catalysts for Epoxy–Acid Coating Compositions", by Rardon, et al.

*Primary Examiner*—Randy Gulakowski
*Attorney, Agent, or Firm*—Kenneth J. Stachel

[57] ABSTRACT

Curable film-forming compositions containing epoxy functional copolymers, polycarboxylic acid crosslinking agents, and triaryltin compound having the chemical structure of $(Ar)_3SnOR$ wherein the aryl groups are the same or different and at least one aryl group is substituted with at least one atom or group selected from the group consisting of carbon, nitrogen, oxygen, sulfur, phosphorous, silicon and halogen and R is selected from the group consisting of hydrogen, alkyl, and acyl groups are disclosed. The compositions do not release benzene during cure. The compositions may be powder or liquid and are useful as clear coats, particularly in a color-plus-clear composite coating system.

26 Claims, No Drawings

COLOR-PLUS-CLEAR COMPOSITE COATING COMPOSITION CONTAINING TIN CATALYSTS

CROSS REFERENCE TO OTHER PATENT APPLICATIONS

This patent application is filed on the same day as the patent application entitled "Catalysts for Epoxy-Acid Coating Compositions" (Rardon, et al.)

The present invention relates to epoxy-based film-forming compositions containing tin catalysts and color-plus-clear composite coating compositions.

Film-forming compositions utilizing epoxy-acid curing mechanisms are well known in the art. Such compositions may be powder or liquid compositions; typical examples are described in U.S. Pat. Nos. 4,650,718; 5,196,485 and 5,407,707. Epoxy-acid coating compositions are suitable as clear topcoats or colored basecoats particularly in color-plus-clear composite coating systems and have become increasingly popular as original finishes on motor vehicles such as automobiles, trucks and motorcycles. Such compositions exhibit excellent appearance, durability, and acid etch resistance properties. These compositions are typically cured at elevated temperatures after being applied to a substrate. Typically, catalysts are present to accelerate the cure of the coating, and one catalyst that has been particularly effective has been triphenyltin hydroxide (TPTOH).

One problem that has developed with the use of TPTOH is the evolution of benzene during the curing process. Benzene is considered environmentally undesirable, and there are stringent regulations on the amount of benzene that may be released into the atmosphere from any given source. Removal of evolved benzene from air exiting a typical automobile paint curing facility can be technically and economically difficult because of the high volumes of air that would be treated for relatively low levels of benzene.

Additionally, further improvements in one-package type of epoxy-acid coating compositions have been sought in the industry in the area of improvements for coating performance properties. Mar resistance of the coating is one such property for which continuing improvement is sought. Such improvements should not be at the detriment of other desired properties of the coating or the coating composition, where one example of the latter is the stability of the coating composition is a one package formulation.

Therefore, it would be desirable to provide an epoxy-acid film-forming coating composition having excellent appearance, durability, and acid etch resistance properties, and improved mar resistance that upon curing of the applied coating from either liquid or powder compositions evolves no benzene or only extremely low levels of benzene (less than 300 parts per million ("ppm") and even as low as 30 ppm for powder compositions).

SUMMARY OF THE INVENTION

In accordance with the present invention, a curable film-forming coating composition is provided comprising a mixture of:

(a) one or more epoxy functional copolymers; (b) one or more polycarboxylic acid crosslinking agent; and (c) one or more triaryltin compounds having the general chemical structure of $(Ar)_3SnOR$ wherein at least one aryl ("AR") group in addition to the bond to the tin atom is substituted with one or more atoms or groups other than hydrogen such as carbon, nitrogen, oxygen, sulfur, phosphorus, silicon and/or halogen. Two or more of the substituted aryl groups can be the same or different. The amounts of these components in the coating composition in weight percent based on the total weight of (a), (b) and (c) are as follows: (a) about 10 to about 90, (b) about 5 to about 95 and (c) an effective catalytic amount for the epoxy acid curing reaction. With this catalytic amount, the ratio of epoxy equivalents to acid equivalents is about 1:0.6 to about 1.0:1.5.

DETAILED DESCRIPTION

Unless otherwise specified, the numerical ranges, amounts, values and percentages such as those for amounts of materials, times and temperatures of reaction, ratios of amounts, values for molecular weight whether number average molecular weight "Mn" or weight average molecular weight ("Mw") and others in the following portion of the specification may be read as if prefaced by the word "about" even though the term "about" may not expressly appear with the value, amount or range. Also it should be understood that in the following description any reference to patents and/or publications is meant to incorporated the specific disclosures referred to in such documents into this specification by reference.

The film-forming composition of the present invention may be solventborne, waterborne or in powder form. By "film-forming", it is meant that resinous material within the composition, upon drying at ambient or elevated temperature or upon heating, forms a self-supporting continuous film on the surface or substrate and includes polymeric materials that upon removal of solvents or carriers present in the composition or upon flowing from heating, can coalesce to form a continuous film. Particularly useful film-forming polymers are those that are capable of curing with crosslinking agents. Waterborne compositions include those that are water dilutable, such as dispersions or emulsions of polymers in water or water/solvent blends. By "powder", it is meant a particulate, finely divided solid material having a particle size of about 0.005 to about 100 microns.

Among the epoxy functional copolymers which can be used in the film-forming composition of the present invention are epoxy-containing addition copolymers such as acrylic polymers which are preferred, epoxy condensation polymers such as polyglycidyl ethers of alcohols and phenols and certain polyepoxide monomers and oligomers. Mixtures of polyepoxides may also be used. Epoxy-containing acrylic polymers are preferred because they yield products which have the optimum combination of coating properties; i.e., smoothness, gloss, durability, and solvent resistance.

The epoxy functional addition copolymer may be prepared by copolymerizing an epoxy functional ethylenically unsaturated monomer such as glycidyl acrylate, glycidyl methacrylate, 3,4-epoxycyclohexylmethyl(meth)acrylate, 2-(3,4-epoxycyclohexyl)ethyl(meth)acrylate, or allyl glycidyl ether, with an ethylenically unsaturated monomer or mixture of monomers free of epoxy functionality.

In the practice of the invention, the epoxy functional monomer is typically copolymerized with at least one other copolymerizable ethylenically unsaturated monomer or mixture of monomers that are free of epoxy functionality. Examples of suitable monomers include esters of acrylic acid or methacrylic acid which can be represented by the structure:

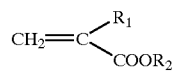

where $R_1$ is hydrogen or methyl and $R_2$ is hydrogen or alkyl having from 1 to 20 carbon atoms in the alkyl group.

Examples of suitable acrylates or methacrylates include ethyl acrylate, propyl acrylate, n-butyl acrylate, isobutyl acrylate, t-butyl acrylate, 2-ethylhexyl acrylate, lauryl acrylate, ethyl methacrylate, propyl methacrylate, n-butyl methacrylate, isobutyl methacrylate, t-butyl methacrylate, lauryl methacrylate, 2-ethylhexyl methacrylate, and so forth. Cyclic esters such as cyclohexyl acrylate and cyclohexyl methacrylate, as well as hydroxyalkyl esters such as 2-hydroxyethyl acrylate or methacrylate, 2-hydroxypropyl acrylate or methacrylate may also be used. In addition, vinyl aliphatic or vinyl aromatic compounds (other than alpha-methyl styrene dimer, which is considered a chain transfer agent) such as acrylonitrile, methacrylonitrile, or styrene can be used.

When the film-forming composition is a solid particulate mixture, i.e., a powder composition, preferably at least one of the monomers used has a glass transition temperature ($T_g$) greater than 200° F. (93° C.) in order to reduce caking and instability problems associated with powder coatings. Suitable monomers include methyl methacrylate, isobornyl methacrylate, trimethylcyclohexyl methacrylate and styrene.

The epoxy containing copolymer can be prepared by traditional free radical initiated polymerization techniques, such as solution or emulsion polymerization, as known in the art using suitable catalysts which include organic peroxides and azo type compounds and chain transfer agents such as alpha-methyl styrene dimer and tertiary dodecyl mercaptan. Preferably, when the film forming coating composition is a liquid coating composition, the epoxy functional addition copolymer is prepared as is described in Patent Application Cooperation Treaty ("PCT") Patent Publication WO US97/09285 at pages 2–26.

The epoxy containing copolymer usually contains (i) 5 to 90 percent by weight, based on the weight of the copolymer, of one or more epoxy functional ethylenically unsaturated monomer and (ii) 10 to 95 percent of a copolymerizable ethylenically unsaturated monomer or mixture of monomers free of epoxy functionality. These percentages by weight are based on the total weight of (i) and (ii). Preferably, the copolymer contains (i) 30 to 70 percent by weight of the epoxy functional monomer and (ii) 30 and 70 percent by weight of one or more other copolymerizable ethylenically unsaturated monomers.

Other suitable epoxy functional copolymers are polyglycidyl ethers of polyhydric phenols and aliphatic alcohols. These copolymers can be produced by etherification of polyhydric phenols or alcohols with an epihalohydrin or dihalohydrin such as epichlorohydrin or dichlorohydrin in the presence of alkali, using techniques known to those skilled in the art.

Examples of suitable polyhydric phenols are 1,1-bis(4-hydroxyphenyl)ethane, 2,2-bis(4-hydroxyphenyl)propane (Bisphenol A), and 2-methyl-1,1-bis(4-hydroxyphenyl) propane. Examples of suitable aliphatic alcohols include acyclic and alicyclic polyols, particularly aliphatic polyols such as ethylene glycol, diethylene glycol, 1,2-propylene glycol, and 1,4-butylene glycol. Also, cycloaliphatic polyols such as 1,2-cyclohexane diol, 1,4-cyclohexane diol, 1,2-bis (hydroxymethyl)cyclohexane, and hydrogenated Bisphenol A can be used.

In addition to the epoxy-containing acrylic polymers and epoxy condensation polymers described above, certain polyepoxide monomers and oligomers can also be used when the film-forming composition is a liquid. Examples of these materials are described in U.S. Pat. No. 4,102,942 at column 3, lines 1–16. Specific examples of low molecular weight polyepoxides are 3,4-epoxycyclohexylmethyl, 3,4-epoxycyclohexanecarboxylate and bis(3,4-epoxycyclohexylmethyl) adipate. These low molecular weight polyepoxides may be used to increase the cure response and solids content of the curable compositions. When used, they are present in amounts up to 30 percent by weight based on the total weight of resin solids in the curable film-forming composition.

When the film-forming composition is a powder composition, the glass transition temperature ($T_g$) of the epoxy functional copolymer is typically 77° F. to 158° F. (25° C. to 70° C.), preferably 95° F. to 131° F. (35° C. to 55° C.). The high $T_g$ contributes to the stability of the powder coating composition. The higher the $T_g$ of the copolymer, the better the stability of the coating. The $T_g$ is described in PRINCIPLES OF POLYMER CHEMISTRY (1953), Cornell University Press. The $T_g$ can actually be measured or it can be calculated as described by Fox in *Bull. Amer. Physics Soc.*, 1, 3, page 123 (1956). The $T_g$ as used for the copolymer herein refers to actually measured values. Differential scanning calorimetry (DSC) can be used (usually at a rate of heating of 18° F. (10° C.) per minute, $T_g$ taken at the first inflection point).

The epoxy functional copolymer has a number average molecular weight ("Mn") typically of 500 to 20,000, and an epoxy equivalent weight typically 150 to 1500. The term "molecular weight" refers to a number average molecular weight as determined by gel permeation chromatography using a polystyrene standard. Therefore, it is not an absolute number average molecular weight which is measured but a number average molecular weight which is a measure relative to a set of polystyrene standards. The preferred number average molecular weight for the epoxy functional copolymer is 500 to 20,000. The term "equivalent weight" is a calculated value based on the relative amounts of the various ingredients used in making the specified material and is based on the solids of the specified material. The relative amounts are those that result in the theoretical weight in grams of the material like a polymer produced from the ingredients and give a theoretical number of the particular functional group that is present in the resulting polymer. The theoretical polymer weight is divided by the theoretical number to give the equivalent weight. For example, epoxy equivalent weight is based on the equivalents of reactive pendant and/or terminal epoxy groups in the epoxy-containing copolymer.

The film-forming coating composition of the present invention further contains a polycarboxylic acid crosslinking agent. The polycarboxylic acid crosslinking agent usually contains at least two acid groups per molecule, and such acid groups are reactive with the polyepoxide to form a crosslinked coating as indicated by its resistance to organic solvent. The parameter of at least two acid groups per molecule is also intended to encompass mixtures of polycarboxylic acid crosslinking agents in which di-functional crosslinking agents are mixed with tri- or higher functionality polyacid crosslinking agents. Among the polycarboxylic acid crosslinking agents which may be used are carboxylic acid group-containing polymers such as acrylic polymers, polyesters, and polyurethanes; oligomers such as ester group-containing oligomers; and monomers.

Acid-functional acrylic crosslinkers may be made by copolymerizing methacrylic acid and/or acrylic acid monomers with other ethylenically unsaturated copolymerizable monomers, using techniques known to those skilled in the art. Alternatively, acid-functional acrylics can be prepared from hydroxy-functional acrylics reacted with cyclic anhydrides using conventional techniques.

When the film-forming coating composition is a liquid, the preferred polycarboxylic acid crosslinking agents are ester group-containing oligomers. Examples include half-esters formed by reacting polyols and 1,2-acid anhydrides or acid functional polyesters derived from polyols and polyacids or anhydrides. The half-esters are preferred because they are of relatively low molecular weight and are quite reactive with epoxy functionality enabling the formulation of high solids fluid compositions while maintaining good properties such as gloss and distinctness of image.

Such ester group-containing oligomers and the preparation thereof are described in U.S. Pat. No. 5,384,367, column 8, line 41 to column 11, line 10.

An additional component that can be present in at least the liquid coating composition is a copolymer of an alpha-olefin or cyclo-olefin and an olefinically unsaturated monoanhydride as in U.S. Pat. No. 4,927,868 (Schimmel, et al.) at column 3, lines 40 through column 4, line 50. The amount of this copolymer can be in the range of 0 to 10 weight percent of the resin solids of the coating composition.

When the composition is a powder composition, the polycarboxylic acid is preferably a crystalline material, more preferably a crystalline aliphatic material containing 4 to 20 carbon atoms. Examples of suitable crystalline acids include adipic, succinic, sebacic, azelaic and dodecanedioic acid. In addition, carboxylic acid functional polyesters may be used to crosslink the powder film-forming composition. Low molecular weight polyesters and half-acid esters can be used which are based on the condensation of aliphatic polyols with aliphatic and/or aromatic polycarboxylic acids or anhydrides, or the reaction of aliphatic polyols and aliphatic and/or aromatic anhydrides, respectively. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol and the like. The polycarboxylic acids and anhydrides may include inter alia, terephthalic acid, isophthalic acid, phthalic acid, phthalic anhydride, tetrahydrophthalic acid, tetrahydrophthalic anhydride, hexahydrophthalic acid, alkylhexahydrophthalic anhydride, chlorendic anhydride and the like. Mixtures of the polycarboxylic acids, anhydrides and polyols may also be used.

In powder film-forming compositions, aliphatic crystalline dicarboxylic acids are preferred, and in particular, dodecanedioic acid is most preferred. The advantage of these crystalline crosslinkers, particularly at the higher levels, is that generally they are incompatible with the epoxy functional copolymer providing for a more stable powder coating.

The ratio of epoxy equivalents to acid equivalents is typically 1:0.6 to 1:1.5. The epoxy functional copolymer preferably is present in the film-forming composition in amounts of 30 to 70 percent by weight. The polycarboxylic acid crosslinking agent is preferably present in the film-forming composition in amounts of 30 to 70 percent by weight. For both the epoxy and polycarboxylic acid the weight percents are based on the total weight of epoxy functional copolymer, polycarboxylic acid crosslinking agent, and triaryltin compound in the film-forming composition. Of course, with these preferred ranges as well as the broader ranges of amounts for these materials expressed as percentages, selection of amounts from the percentages for any of the materials and any other additional materials for the coating composition can give a total percentage equal to 100 percent.

The film-forming coating composition of the present invention further comprises the triaryltin compound with the chemical structure of $(Ar)_3SnOR$ ("Structure 1") as described above. At least one of the three aryl groups is a substituted aryl group, while any other aryl groups can be a phenyl group. It is preferred for minimizing the evolution of benzene to have all three aryl groups substituted. Each aryl group can be substituted with one or more groups in addition to tin. The aryl substituents can be the same or different and are atoms or groups with one and are or more atoms of carbon, nitrogen, oxygen, sulfur, phosphorus, silicon and/or halogen. Non-exclusive examples of substituents include: groups with 1 to 12 carbon atoms with or without the above referenced hetero-atoms; methyl, which is preferred; ethyl; 2,4,6-trimethyl; 2-propyl; t-butyl; carboethoxy, methoxy; methylsulfonylamido; fluoro; trifluoromethyl; acetoxy; acetamido; and acetoxylmethyl. The substituent may also be a fused carbocyclic ring such as naphthyl. As a further description of some of the aforementioned and other substituents as non-exclusive examples of Ar groups include the following aromatic moieties: those aryl groups having 7 to 15 carbon atoms such as: ortho, meta and/or para-tolyl; ethyl phenyl; xylyl; mesityl; cumenyl; naphthyl, and the like. Tolyl is preferred as the aryl group. As shown above mixed aryl and alkylaryl groups may be present on the triaryltin compound. The R group of Structure 1 above can be comprised of hydrogen, which is preferred; alkyl; or acyl. Nonexclusive examples of the latter two types of R groups are alkyl groups with one to eight carbon atoms such as methyl, ethyl, propyl and the like, and acyl groups with one to twelve carbons such as acetyl, butyl carbonyl, 3-octyl carbonyl and dodecyl carbonyl.

The triaryltin compound can be made by any method known to those skilled in the art for instance triaryltin hydroxide can be prepared as disclosed in WO 95/0493 or EP 665854. The preferred catalyst is tritolyltin hydroxide that has been treated to remove as many solid impurities and other tin compound impurities as possible. These impurities result from a preparation reaction as in the reaction of tritolyltin chloride with alkali metal hydroxide like sodium hydroxide. The reaction product of such a reaction is dissolved in an organic solvent such as toluene and filtered and the tritolyltin hydroxide is recrystallized from the organic solvent. Other methods known in the art for purification of reaction products can be used to remove similar types of impurities from preparation reactions. The preferred effective catalytic amount of the triaryltin compound like the tritolyltin hydroxide in the coating composition is an amount of 0.1 to 5 and more preferably from 0.3 to 3 percent by weight based on the epoxy functional copolymer, acid crosslinking agent, and triaryltin hydroxide.

The film-forming coating composition of the present invention may optionally contain additives such as plasticizers, anti-oxidants, aminoplasts, blocked isocyanates, stabilizers, waxes, degassing additives such as benzoin, adjuvant resin to modify and optimize coating properties, and ultraviolet (UV) light absorbers. These optional additives, when present, are used in amounts (on an individual basis) up to about 15 percent by weight based on the total weight of resin solids of the film-forming composition. When the epoxy-acid coating composition is a powder coating composition, additional additives can be like those shown in PCT Patent Publications WO 97/29854 and WO 97/30131, where for the latter is at page 26, lines 11–27 and page 27, lines 1–17. When the epoxy-acid coating composition is a liquid coating, the additional additives can be those shown in U.S. Pat. No. 5,196,484 at column 8, line 41 through column 9, line 25.

The powder composition is typically prepared by blending the epoxy functional copolymer and the polycarboxylic acid crosslinking agent for 15 minutes in a Henschel blade blender. The powder is then usually extruded through a Baker-Perkins twin screw extruder uncatalyzed at temperature between 230° F. to 235° F. (110 to 113° C). The catalyst is then added and the powder blended in the Henschel blender, hammer milled and re-extruded at a temperature between 190° F. to 200° F. (87° C. to 93° C.). The finished powder can subsequently be classified to a particle size of usually between 20–30 microns in a cyclone grinder/sifter.

Usually, the powder coating composition has a melt viscosity of less than 5,000 centipoise, preferably less than 2,500 centipoise and more preferably less than 2,000 centipoise.

The melt viscosity of the powder coating is measured using a Brookfield Model DV-II viscometer equipped with a #21 spindle. The test is performed by placing the epoxy functional copolymer or powder coating composition in a cell which is then loaded into a heated oven. When the copolymer or powder begins to melt, the #21 spindle is lowered into the cell and rotated. The melt viscosity in centipoise is plotted versus time in minutes. The lowest viscosity recorded, prior to gelling of the copolymer or powder coating, is taken as the melt viscosity. The measurement in centipoise (cps) is taken at the curing temperature of the powder coating, typically 275° F. (135° C.) at 1 revolution per minute (rpm).

Melt viscosity of the powder coating is a measure of flow response. The lower the measured number, i.e., the lower the resistance to flow, the smoother the final film. The powder film-forming compositions of the present invention are prepared with high $T_g$ epoxy functional copolymers which provide good stability. The epoxy functional copolymers have relatively high melt viscosities and yet the melt viscosities of the powder coating compositions are low. This results in excellent gloss and appearance of the cured coatings.

The film-forming composition of the present invention may contain color pigments conventionally used in surface types of coatings. For example, the composition may be used as a high gloss monocoat; that is, a high gloss pigmented coating. Also the coating composition can be used as the base coat in a base coat and clear coat composite coating, where the high gloss is provided by the clear coat. By "high gloss", it is meant that the cured coating has a 20° gloss and/or a DOI ("distinctness of image") measurement of at least about 80 as measured by standard techniques known to those skilled in the art.

The film-forming composition of the present invention is preferably used as the clear coat layer in a multi-component composite coating composition such as a "color-plus-clear" coating system. In a color-plus-clear application, a composite coating is applied to a substrate. The composite coating comprises a pigmented film-forming composition serving as a base coat and a clear film-forming composition applied over the base coat serving as a transparent topcoat.

The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes. The resinous binders for the base coat can be organic solvent-based materials such as those described in U.S. Pat. No. 4,220,679, note column 2, line 24 continuing through column 4, line 40. Also, water-based coating compositions such as those described in U.S. Pat. Nos. 4,403,003; 4,147,679 and 5,071,904 can be used as the binder in the base coat composition. The base coat composition contains pigments to give it color. Suitable metallic pigments include aluminum flake, copper bronze flake and metal oxide coated mica. Besides the metallic pigments, the base coat compositions may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green.

Optional ingredients in the base coat composition are those which are well known in the art of formulating surface coatings and include surfactants, flow control agents, thixotropic agents, fillers, anti-gassing agents, organic co-solvents, catalysts, and other customary auxiliaries. Examples of these materials and suitable amounts are described in U.S. Pat. Nos. 4,220,679; 4,403,003; 4,147,769 and 5,071,904.

The base coat compositions can be applied to the substrate by any conventional coating technique such as brushing, spraying, dipping or flowing, but they are most often applied by spraying. The usual spray techniques and equipment for air spraying, airless spray and electrostatic spraying in either manual or automatic methods can be used.

During application of the base coat to the substrate, a film of the base coat is formed on the substrate typically in a thickness of about 0.1 to 5 mils (2.54 to 127 microns), preferably 0.1 to 2 mils (2.54 to 50.4 microns).

After forming a film of the base coat on the substrate, the base coat can be cured or alternately given a drying step in which solvent is driven out of the base coat film by heating or an air-drying period before application of the clear coat. Suitable drying conditions will depend on the particular base coat composition, and on the ambient humidity if the composition is waterborne, but in general, a drying time of from 1 to 15 minutes at a temperature of 75° F. to 200° F. (21° C. to 93° C.) will be adequate.

The clear topcoat composition is applied to the base coat by any of the conventional coating techniques mentioned above, although spray applications are preferred. As mentioned above, the clear topcoat can be applied to a cured or dried base coat before the base coat has been cured. In the latter instance, the two coatings are then heated to conjointly harden both layers. Typical curing conditions are at 265° F. to 300° F. (129° C. to 149° C.) for 20 to 30 minutes. The clear coating thickness (dry film thickness) is typically about 1 to 6 mils (25.4 to 152.4 microns).

The invention will be further described by reference to the following examples. Unless otherwise indicated, all parts are by weight.

EXAMPLES

For Comparative Examples A–D and Example A, a Premix Composition A was prepared as a basemix for uncatalyzed solventborne epoxy-acid clearcoat. This Premix A was prepared under agitation with the following mixture of ingredients added together in the order shown in Table I:

TABLE I

| Ingredients | weight (grams) |
|---|---|
| Tinuvin 328[1] | 2.7 |
| Tinuvin 292[2] | 0.4 |
| Polybutylacrylate | 0.4 |
| Poly 2-ethylhexyl acrylate[3] | 0.5 |
| Ethyl 3-ethoxypropionate | 37.2 |
| n-Propanol | 6.0 |
| R-812 silica dispersion[4] | 9.4 |
| GMA Acrylic Copolymer[5] | 53.2 |
| GMA Acrylic Copolymer[6] | 26.4 |
| Acid functional polyester[7] | 48.2 |
| 1-Octene/maleic anhydride/ethanol copolymer | 13.0 |
| | 197.4 |

[1]2-(2'-Hydroxy-3',5'-ditert-amylphenyl) benzotriazole UV stabilizer available from Ciba-Geigy Corp.
[2]Bis (1,2,2,6,6-pentamethyl-4-piperidinyl) sebacate available from Ciba-Geigy Corp.
[3]Poly 2-ethylhexyl acrylate is a flow control agent of Mw = 32,936 and Mn = 7934 made in xylene at 50% solids.
[4]R-812 silica from Degussa is dispersed in n-amyl alcohol and TMP/methylhexahydrophthalic anhydride half-ester of Example G in U.S. Pat. No. 5,196,485.
[5]Refer to Example A of U.S. Pat. No. 5,196,485.
[6]Refer to Example E of U.S. Pat. No. 5,196,485.
[7]Refer to Example F of U.S. Pat. No. 5,196,485.

TABLE II

| Description | Comparative Example A | Comparative Example B | Comparative Example C | Comparative Example D | Example A |
|---|---|---|---|---|---|
| Premix A | 197.4 | 197.4 | 197.4 | 197.4 | 197.4 |
| Armeen DM12D[1] | — | 0.4 | 1.0 | — | — |
| TPT-OH[2] | — | — | — | 1.0 | — |
| TTT-OH[3] | — | — | — | — | 1.0 |
|  | 197.4 | 197.8 | 198.4 | 198.4 | 198.4 |

[1]Tertiary amine catalyst commercially available from Akzo-Nobel Corp.
[2]Triphenyltin hydroxide commercially available from Elf Atochem North America.
[3]Tritolytin hydroxide supplied by from Elf Atochem North America.

These film-forming compositions were applied to pigmented basecoats to form color-plus-clear composite coatings. The pigmented basecoats are available from PPG Industries, Inc. and are identified as HWBS-9517 (Comparative Examples 1–4 and Example 1—"Set 1"), a black pigmented waterborne basecoat, as NHU-9517 (Comparative Examples 5–8 and Example 2—"Set 2"), a black pigmented solventborne basecoat. These basecoats were applied to commercially prepared (ACT Industries) steel substrate panels, which were first coated with an ED-5000 electrocoat primer and a powder primer, identified as PCV-70100, both of which are commercially available from PPG Industries, Inc., Pittsburgh, Pa.

The basecoat was spray applied in two coats to the electrocoated and primed steel panels at a temperature of 72° F. (22° C.). There was no flash between the two coats. After applying the second coat of basecoat, a five minute flash (at 200° F. (93° C.) for Examples of Set 1 and at 72° F. (22° C.) for Examples of Set 2) was allowed before the clearcoat compositions were applied. The clear coating compositions were applied in two coats with a 90-second 72° F. (22° C.) flash time between coats. The composite coating was allowed to air flash at 72° F. (22° C.) for 10 minutes before curing at 285° F. (140° C.) for 30 minutes in a horizontal position. The properties of the composite coatings are reported in the following Table III.

TABLE III

|  | Comparative Example 1 | Comparative Example 2 | Comparative Example 3 | Comparative Example 4 | Example 1 |
|---|---|---|---|---|---|
| Composition | Comparative Example A | Comparative Example B | Comparative Example C | Comparative Example D | A |
| Initial Visc. @ 80° F. (27° C.) | 25 seconds | 25 seconds | 25 seconds | 25 seconds | 25 seconds |
| Visc. (80° F.) (27° C.) after 4 days @ 100° F. (38° C.) | 28 seconds | 32 seconds | 47 seconds | 30 seconds | 30 seconds |
| Basecoat Film Thickness (mls/microns.) | 0.7/19 | 0.7/19 | 0.7/18 | 0.7/18 | 0.7/18 |
| Clearcoat Film Thickness (mls/microns) | 1.8/47 | 1.9/49 | 1.9/49 | 1.9/47 | 2/50 |
| 20° Gloss | 83 | 83 | 83 | 83 | 83 |
| Distinctness of Image (DOI) | 97 | 97 | 96 | 96 | 97 |
| MAR (% gloss retention) | 29 | 39 | 56 | 41 | 43 |
| Headspace Benzene | 4 ppm @ 140° C. | N/A | N/A | 292 ppm @ 140° C. | 5 ppm @ 140° C. |
| Headspace Toluene | <1 ppm @ 140° C. | N/A | N/A | <1 ppm @ 140° C. | 2292 ppm @ 140° C. |
|  | Comparative Example 5 | Comparative Example 6 | Comparative Example 7 | Comparative Example 8 | Example 2 |
| Composition | Comparative Example A | Comparative Example B | Comparative Example C | Comparative Example D | Example A |
| Initial Visc. @ 80° F. (27° C.) | 25 seconds | 25 seconds | 24 seconds | 24 seconds | 24 seconds |
| Visc. (80° F.) (27° F.) after 3 days @ 100° F. (38° C.) | 26 seconds | 31 seconds | 36 seconds | 28 seconds | 28 seconds |
| Basecoat Film Thickness (mls/microns) | 0.8/20 | 0.8/20 | 0.8/19 | 0.7/19 | 0.7/18 |
| Clearcoat Film Thickness (mls/microns) | 2/51 | 2/51 | 2/51 | 2/50 | 2/51 |
| 20° Gloss | 84 | 84 | 83 | 84 | 84 |
| Distinctness of Image (DOI) | 95 | 90 | 87 | 97 | 97 |
| MAR (% gloss retention) | 20 | 26 | 36 | 31 | 41 |

The 20° Gloss, DOI, and MAR (% gloss retention) were measured as described in TABLE IV below and the change from initial viscosity to viscosity at (80° F.) (27° C.) after three days @ 100° F. (38° C.) is a measure of stability as described in U.S. Pat. No. 5,196,485.

Table III shows that Examples 1 and 2 result in improved mar percent gloss retention compared to Comparative Examples 1–8 while maintaining comparable stability of the coating composition. Accomplishing these improvements do not detrimentally affect the properties of gloss or DOI which are comparable to those of the comparative examples.

POWDER COATING COMPOSITIONS EXAMPLES

Each epoxy-acid powder clear coat composition in Examples 3 and 4 and Comparative Example 9 shown below in Table IV are shown in amounts of parts by weight, and each composition was processed in the following manner. The components were blended in a Henschel Blender for 30 to 60 seconds. The mixtures were then extruded through a Werner & Pfleider co-rotating twin screw extruder at a 450 RPM screw speed and an extrudate temperature of 113° C. to 115° C. The extruded material was then ground and classified to a particle size of 17 to 27 microns using an ACM1 Grinder (Air Classifying Mill from Micron Powder Systems, Summit, N.J.). The finished powders were electrostatically sprayed onto test panels and evaluated for coating properties.

Comparative Example 9 is a comparative powder coating composition containing ARMEEN M2C[8] as the catalyst. Examples 3 and 4 show powder coating compositions of the present invention containing different concentrations of the tritolyltin hydroxide.

TABLE IV

| Ingredient | Example 9 Comparative | Example 3 | Example 4 |
|---|---|---|---|
| GMA Functional Acrylic[1] | 759.7 | 759.7 | 754.5 |
| DDDA[2] | 249.4 | 249.4 | 247.6 |
| Acrylic Flow Agent[3] | 12.1 | 12.1 | 12.1 |
| Benzoin | 2.2 | 2.2 | 2.2 |
| Microwax C[4] | 6.6 | 6.6 | 6.6 |
| TINUVIN 144[5] | 22.0 | 22.0 | 22.0 |
| CGL-1545[6] | 22.0 | 22.0 | 22.0 |
| GCA-1[7] | 22.0 | 22.0 | 22.0 |
| ARMEEN M2C[8] | 4.1 | 0.0 | 0.0 |
| TTTOH | 0.0 | 4.1 | 11.0 |
| Gel Time (seconds)[9] | 194 | 204 | 172 |

[1] Acrylic as described in PCT Patent Publication WO 97/29854 and PCT patent application Ser. No. US97/16800. The single epoxy acrylic polymer, which is the predominant film-forming polymer, has a number average molecular weight ("Mn") range, a range of glass transition temperature (Tg), and a range of epoxy content all as shown in Table A below.
[2] Dodecanedioic Acid.
[3] Acrylic flow agent prepared by solution polymerization in xylene of the following monomers: 2% N,N-dimethylaminoethyl methacrylate, 16.8% hydroxyethyl acrylate, and 81.2% 2-ethylhexyl acrylate. The polymerization was at reflux temperature in the presence of t-amyl peracetate (commercially available as LUPERSOL 555M60 from Elf Atochem, Inc.) and t-butyl peracetate. The acrylic flow agent was vacuum stripped (1.0 mm of Hg) at 100° C. to 100% solids.
[4] Wax C Micro Powder, a fatty acid amide (ethylene bis-stearoylamide), commercially available from Hoechst-Celanese Corporation (New Jersey or North Carolina).
[5] TINUVIN 144 (2-tert-butyl-2-(4-hydroxy-3,5-di-tert-butylbenzyl)[bis(methyl-2,2,6,6,-tetramethyl-4-piperidinyl)]dipropionate), an ultraviolet light stabilizer available from Ciba-Geigy Corp.
[6] CGL-1545 (2-[4((2-Hydroxy-3-(2-ethylhexyloxy)propyl]-oxy]-2-hydroxyphenyl)-4,6-bis(2,4-dimethylphenyl)-1,3,5-triazine), an ultraviolet light stabilizer available from Ciba-Geigy Corp.
[7] GCA-1, an anti-yellowing agent commercially available from Sanko Chemical Corp.
[8] Methyl dicocoamine available from Akzo-Nobel Corp.
[9] Gel time was measured on a hot plate at 293° F. (145° C.).

TABLE A

| | Mn (grams) | Tg ° C.[1] | Epoxy Content[2] |
|---|---|---|---|
| Single Epoxy Acrylic Polymer | about 1000 to about 5500 | about 30 to about 60° C. as measured or 50 to 85° C.[1] | 35 to 85 |

[1] As calculated by the Acrylic Glass Transition Temperature Analyzer from Rohm and Haas Company which is based on the Fox equation.
[2] (GMA) As weight percent of the monomers to prepare the epoxy acrylic polymer.

The epoxy acrylic polymer is prepared by traditional free radical initiated polymerization techniques using suitable catalysts which include organic peroxides and azo-type compounds and chain transfer agents such as alpha-methyl styrene dimer and tertiary dodecyl mercaptan. The preparation of the epoxy copolymer as an epoxy-containing acrylic polymer may be conducted as disclosed in U.S. Pat. No. 4,650,718 (column 1, line 61 through column 3, line 40 and column 4, line 55 through column 9, line 15), incorporated herein by reference. The preparation of the epoxy acrylic polymer utilized as the single copolymer for the main film-forming polymer of the powder composition usually has amounts of the (i) and (ii) monomers in the following ranges: (i) 35 to 65 percent by weight of the glycidyl functional monomer and (ii) 35 to 65 percent by weight of one or more copolymerizable ethylenically unsaturated monomers free of glycidyl functionality. Most preferably, the (ii) monomer is methylmethacrylate or trimethylcyclohexyl methacrylate. In addition to the (i) and (ii) monomers, the epoxy acrylic polymer can also have from 5 to 20 percent by weight, based on weight of the total monomers for the polymer, of one or more additional copolymerizable monomers different from the (i) and (ii) monomers, like butylmethacrylate. Although other ethylenically unsaturated monomers can be present in the epoxy acrylic polymer, the percentages by weight of the aforementioned monomers including any styrene preferably are based on the total weight of (i), and (ii) monomers, to achieve a total of 100 percent.

In addition to the aforementioned Mn, the single type of epoxy acrylic polymer preferably has a weight average molecular weight typically between about 1000 and 5500 and most preferably about 2000 to about 4000 and a peak molecular weight in the range of about 2000 to 5500. Also, the single type of epoxy acrylic polymer preferably has the aforelisted epoxy content so that there is from 3.0 to 5.9 moles of glycidyl functional ethylenically unsaturated monomer per kilogram of epoxy functional copolymer, more suitably between 3.5 and 5.1 moles of glycidyl functional monomer per kilogram of epoxy copolymer.

The powder coating compositions of Comparative Example 9 and Examples 3 and 4 were prepared for testing in the following manner. Test panels, coated with electrocoat primer commercially available from PPG Industries, Inc. as ED-5000, were coated with a primer coat and with basecoat, by spray application to a film thickness of about 1.1 mils (27.9 microns) and 0.6 mils (15.2 microns), respectively. The primer was a black solventborne primer commercially available from Mehnert & Veek, Germany, and the base coat was a black waterborne basecoat, commercially available from BASF, Germany. The basecoated panels were then flash baked for 10 minutes at 176° F. (80° C.) before electrostatically spray applying each powder clear coat composition of Examples 3 and 4 and Comparative Example 9. The powder coated panels were then cured for 30 minutes at 293° F. (145° C.). The dry film thickness (DFT) of the powder clear coat was 2.6 to 2.8 mils (66 to 71 microns). The test panels were then tested for appearance using 20° gloss, haze, and DOI as criteria. Also tested were mar resistance, resistance to 36% $H_2SO_4$, and humidity resistance. The results are tabulated in the table IV below. The mar resistance was tested using the following procedure.

1. Dry Bon-Ami Cleanser (Feldspar/Calcite cleanser manufactured by Faultless Starch/Bon Ami Company, Kansas City, Mo.) was applied to one half of the test panel.
2. The excess cleanser was tapped off so that a thin film of cleanser remained on the test panel.
3. The acrylic finger of an Atlas AATCC Crockmeter, model CM-5 manufactured by Atlas Electric Devices Company, Chicago, Ill., was covered with a two inch by two inch piece of felt cloth, obtainable from Atlas Electric Devices.
4. The cleanser coated panel was rubbed with the felt cloth 10 times (10 double rubs) using the Crockmeter.
5. The test was repeated at least once changing the felt cloth after each test.

6. After testing, the panel was washed with water to remove the cleanser and then carefully dried.

7. The 20° gloss was measured using a gloss meter manufactured by Pacific Scientific Company (California), on both the unmarred part of the panel and the marred parts of the panel. The difference in gloss was a measure of the mar resistance. The smaller the difference, the greater the mar resistance. A percentage of gloss retention was calculated by the following formula: Percent Gloss Retention=[(Difference in Gloss)/(Initial Gloss)]×100. The larger the percent gloss retention, the greater the mar resistance.

TABLE V

| Test | Comparative Example 9 | Example 3 | Example 4 |
|---|---|---|---|
| 20° Gloss* | 83 | 84 | 84 |
| Haze* | 12 | 9 | 8 |
| DOI* | 93 | 88 | 88 |
| Mar (% Gloss Retention)[1] | 54% | 80% | 79% |
| Acid Resistance[2] - Min. to Damage | 20 | 26 | 27 |
| Humidity (10 Day)[3] | | | |
| 20° Gloss* | 82 | 83 | 83 |
| DOI* | 86 | 78 | 91 |
| Haze* | 10 | 9 | 10 |

*Appearance Properties: 20° Gloss and Haze were measured by a BYK Gardner Haze - Gloss Meter. Higher numbers for gloss indicate better performance and lower numbers for Haze indicate better performance. Haze numbers over 30 are considered unacceptable. Distinction of Image (DOI) was measured by a Hunter Lab's Dorigon II where higher numbers indicate better performance.
[1]Mar was measured by the method described above.
[2]Acid Resistance was performed by heating the test panels to 65° C. (±2° C.) and adding a 50 micro-liter drop of 36% $H_2SO_4$ every minute for 30 minutes and determining the length of time it takes for the acid to etch in to the coating.
[3]Panels were exposed to 100% humidity at 100° F. for 10 days per ASTM method D-2247.

The examples of Table V show that the tritolyltin hydroxide provides some improved properties over the Armeen M2C catalyst. This is particularly the case in the area of improved mar resistance and improved acid resistance.

We claim:

1. A curable film-forming composition comprising a mixture of:
   (a) about 10 to about 90 percent by weight based on the total weight of (a), (b) and (c) of at least one epoxy functional copolymer;
   (b) about 5 to about 95 percent by weight based on the total weight of (a), (b) and (c) of at least one polycarboxylic acid crosslinking agent; and
   (c) an effective catalytic amount of at least one triaryltin compound having the chemical structure of $(Ar)_3SnOR$ wherein the aryl groups are the same or different and at least one aryl group is substituted with at least one atom or group selected from the group consisting of carbon, nitrogen, oxygen, sulfur, phosphorous, silicon and halogen and R is selected from the group consisting of hydrogen, alkyl, and acyl groups.

2. The curable film-forming composition of claim 1 wherein the triaryltin compound has substituted aryl groups where the substituents are selected from the group consisting of: those with 1 to 12 carbon atoms with or without heteroatoms like oxygen, methyl, ethyl, 2,4,6-trimethyl, 2-propyl, t-butyl, carboethoxy, methoxy, methylsulfonylamido, fluoro, trifluoromethyl, acetoxy, acetamido, acetoxylmethyl, and naphthyl and wherein the R group is selected from the group consisting of hydrogen and alkyl groups with one to eight carbon atoms, and acetly, butyl carbonyl, and dodecyl carbonyl.

3. The curable film-forming composition of claim 1 wherein the triaryltin compound has substituted aryl groups that are aromatic moieties selected from the group consisting of: tolyl, ethyl phenyl, xylyl, mesityl, cumenyl, and naphthyl.

4. The curable film-forming composition of claim 1 wherein the triaryltin compound is triaryltin hydroxide where the aryl group has 7 to 15 carbon atoms.

5. The curable film-forming composition of claim 1, wherein the triaryltin compound has hydrogen as the R group.

6. The curable film-forming composition of claim 1 wherein the ratio of epoxy equivalents to acid equivalents is about 1:0.6 to 1:1.5.

7. The curable film-forming composition of claim 1 wherein the epoxy functional copolymer is formed by polymerizing under free radical initiated polymerization conditions:
   (i) about 5 to about 90 percent by weight based on the total weight of (i) and (ii) of at least one glycidyl functional ethylenically unsaturated monomer, and
   (ii) about 10 to about 95 percent by weight based on the total weight of (i) and (ii) of a copolymerizable ethylenically unsaturated monomer or mixture of monomers free of glycidyl functionality.

8. The curable film-forming composition of claim 7 wherein the copolymerizable ethylenically unsaturated monomer of (ii) is selected from the group consisting of alkyl acrylates containing from about 1 to 20 carbon atoms in the alkyl group, alkyl methacrylates containing from about 1 to 20 carbon atoms in the alkyl group, vinyl aromatic compounds and vinyl aliphatic compounds.

9. The curable film-forming composition of claim 1 wherein the epoxy functional copolymer has a number average molecular weight of about 500 to about 20,000.

10. The curable film-forming composition of claim 1 wherein the epoxy functional copolymer has an epoxy equivalent weight of about 150 to about 1500.

11. The curable film-forming composition of claim 1 wherein the polycarboxylic acid is a crystalline material containing from about 4 to 20 carbon atoms.

12. The curable film-forming composition of claim 11 wherein the polycarboxylic acid is dodecanedioic acid.

13. The curable film-forming composition of claim 1 wherein the triaryltin hydroxide is tritolyltin hydroxide.

14. The curable film-forming composition of claim 1 wherein the epoxy functional copolymer of (a) is present in an amount of about 30 to about 70 percent by based on the total weight of (a), (b) and (c).

15. The curable film-forming composition of claim 1 wherein the polycarboxylic acid crosslinking agent of (b) is present in an amount of about 30 to about 70 percent by weight based on the total weight of (a), (b) and (c).

16. The curable film-forming composition of claim 1 wherein the triaryltin hydroxide of (c) is present in an amount of about 0.3 to about 3 percent by weight based on the total weight of (a), (b) and (c).

17. The curable film-forming composition of claim 1 wherein the epoxy functional copolymer of (a) has a $T_g$ of about 77° F. to 158° F. (25° C. to 70° C.) and the curable film-forming composition is a solid, particulate mixture.

18. The curable film-forming composition of claim 17 wherein the composition has a melt viscosity less than about 5000 centipoise.

19. The curable film-forming composition of claim 1 where the coating composition is a solventborne clear coat composition.

20. A multi-component composite coating composition comprising a pigmented film-forming composition serving as a base coat and a clear film-forming composition serving as a transparent topcoat over the base coat wherein the transparent topcoat is a curable film-forming composition comprising a mixture of:
(a) about 10 to about 90 percent by weight based on the total weight of (a), (b) and (c) of an epoxy functional copolymer;
(b) about 5 to about 95 percent by weight based on the total weight of (a), (b) and (c) of a polycarboxylic acid crosslinking agent; and
(c) about 0.1 to about 5 percent by weight based on the total weight of (a), (b) and (c) of a triaryltin compound having the chemical structure of $(Ar)_3SnOR$ wherein the aryl groups are the same or different and at least one aryl group is substituted with at least one atom or group selected from the group consisting of carbon, nitrogen, oxygen, sulfur, phosphorous, silicon and halogen and R is selected from the group consisting of hydrogen, alkyl, and acyl groups.

21. The multi-component composite coating composition of claim 20 in which the epoxy functional copolymer is formed by polymerizing under free radical initiated polymerization conditions:
(i) about 5 to about 90 percent by weight based on the total weight of (i) and (ii) of at least one glycidyl functional ethylenically unsaturated monomer, and
(ii) about 10 to about 95 percent by weight based on the total weight of (i) and (ii) of a copolymerizable ethylenically unsaturated monomer or mixture of monomers free of glycidyl functionality; and
where the ratio of epoxy equivalents to acid equivalents in the clear film-forming composition is about 1:0.6 to 1:1.5, and wherein the triaryltin compound is triaryltin hydroxide wherein each aryl group has about 7 to 15 carbon atoms.

22. The multi-component composite coating composition of claim 21 in which the copolymerizable ethylenically unsaturated monomer of (ii) is selected from the group consisting of alkyl acrylates containing from 1 to 20 carbon atoms in the alkyl group, alkyl methacrylates containing from 1 to 20 carbon atoms in the alkyl group, vinyl aromatic compounds and vinyl aliphatic compounds, and wherein the polycarboxylic acid is a crystalline material containing from about 4 to 20 carbon atoms.

23. The multi-component composite coating composition of claim 20 wherein the epoxy functional copolymer has a number average molecular weight of about 500 to about 20,000 and an epoxy equivalent weight of about 150 to about 1500.

24. The multi-component composite coating composition of claim 20 wherein the polycarboxylic acid is dodecanedioic acid, wherein the triaryltin hydroxide is tritolyltin hydroxide; and wherein the epoxy functional copolymer of (a) is present in the clear film-forming composition in an amount of about 30 to about 70 percent by weight based on the total.

25. The multi-component composite coating composition of claim 20 wherein the polycarboxylic acid crosslinking agent of (b) is present in the clear film-forming composition in an amount of about 30 to about 70 percent by weight; and wherein the triaryltin hydroxide of (c) is present in the clear film-forming composition in an amount of about 0.3 to about 3 percent by weight both based on the total weight of (a), (b) and (c).

26. The multi-component composite coating composition of claim 20 wherein the epoxy functional copolymer of (a) has a $T_g$ of about 77° F. to 158° F. (25° C. to 70° C.) and the clear film-forming composition is a solid, particulate mixture having a melt viscosity less than about 5000 centipoise.

* * * * *